United States Patent
Li et al.

(10) Patent No.: US 12,134,735 B1
(45) Date of Patent: Nov. 5, 2024

(54) LOW-SHRINKAGE AND HIGH-STRENGTH PLANT-BASED RESINOUS BLOCKING AGENT AND PREPARATION METHOD THEREOF

(71) Applicant: Southwest Petroleum University, Chengdu (CN)

(72) Inventors: Yongming Li, Chengdu (CN); Yadong Chen, Chengdu (CN); Jiandu Ye, Chengdu (CN); Dingyuan Zhang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/537,488

(22) Filed: Dec. 12, 2023

(30) Foreign Application Priority Data

Jun. 19, 2023 (CN) .......................... 202310720880.9

(51) Int. Cl.
*C09K 8/82* (2006.01)

(52) U.S. Cl.
CPC ....................................... *C09K 8/82* (2013.01)

(58) Field of Classification Search
CPC ........ C09K 8/68; C09K 8/685; C09K 8/5086; C09K 2208/08; C09K 8/80; C09K 8/82
See application file for complete search history.

(56) References Cited

U.S. PATENT DOCUMENTS

2014/0262212 A1   9/2014   Sherlin

FOREIGN PATENT DOCUMENTS

| CN | 103012841 A | | 4/2013 | |
|---|---|---|---|---|
| CN | 103232598 A | | 8/2013 | |
| CN | 106832789 A | * | 6/2017 | |
| CN | 110607077 A | | 12/2019 | |
| CN | 111218264 A | | 6/2020 | |
| CN | 113355071 A | * | 9/2021 | |
| CN | 114874633 A | | 8/2022 | |
| CN | 116042198 A | * | 5/2023 | ........... C07D 301/12 |
| JP | 2000-248151 A | | 9/2000 | |
| KR | 20120036380 A | * | 4/2012 | |

OTHER PUBLICATIONS

Ambrozic, R et al., "Novel epoxy-benzoxazine water-based emulsions with reactive benzoxazine surfactants for coatings," eXPRESS Polymer Letters, Oct. 1, 2014, pp. 574-587, vol. 8, Issue 8.
Ma, Yangyang, "Study on Biomass Derived Resins for the Modification of Pitch," China Excellent Master's Thesis Full-text Database Engineering and Technology Edition II, Jan. 15, 2016, 64 pages.
Patil, Deepak M., et al., "Enhancement of anti-corrosive performances of cardanol based amine functional benzoxazine resin by copolymerizing with epoxy resins," Progress in Organic Coatings, Apr. 30, 2017, pp. 18-28, vol. 105 Elsevier BV, NL (XP 029934021).
Yang, Biao et al., "Performance evaluation of epoxy resin liquid plug sealing and blocking agent system" Oilfield Chemistry, Jun. 25, 2020, pp. 239-244, vol. 37, Issue No. 2.
Zhang, Sumeng, "Preparation of Side Chain Fluorene Benzoxazine Monomers and Study on Polymerization Properties", China Excellent Master's Thesis Full-text Database Engineering and Technology Edition I, Dec. 15, 2021, submitted May 29, 2021, 82 Pages.
Amornkitbamrung, Lunjakorn, et al., "Effects of glutaric anhydride functionalization on filler-free benzoxazine/epoxy copolymers with shape memory and self-healing properties under near-infrared light actuation," Journal of Science:—Advanced Materials and Devices, Jun. 3, 2022, 10 pages, vol. 7, Issue 3.

* cited by examiner

*Primary Examiner* — Kumar R Bhushan
(74) *Attorney, Agent, or Firm* — MUNCY, GEISSLER, OLDS & LOWE, P.C.

(57) ABSTRACT

The present invention relates to a low-shrinkage and high-strength plant-based resinous blocking agent and preparation method thereof, and belongs to the technical field of oilfield development. The resinous blocking agent consists of the following substances according to weight parts: 37.2~47.8 parts of epoxy plant oil, 19.8~37.2 parts of benzoxazine, 22.9~31.6 parts of curing agents, 0.8~1.8 parts of initiators, 1.2~1.8 parts of toughening agents, 0.5~1.2 parts of reinforcing agents, wherein the sum of the weight parts of the above substances is 100 parts, the epoxy plant oil is obtained through epoxidation on unsaturated carbon-carbon double bonds in a molecule of dehydrated plant oil; the benzoxazine is synthesized from long-chain diamine, monohydric plant phenol and paraformaldehyde. The blocking agent has the advantages such as high compressive strength, degradability, low shrinkage and excellent plugging performance, is easy to obtain cheap raw materials and controllable to a preparation process, can meet the requirements of oil-gas reservoirs for high-strength blocking agents, and has a broad market prospect.

6 Claims, No Drawings

LOW-SHRINKAGE AND HIGH-STRENGTH PLANT-BASED RESINOUS BLOCKING AGENT AND PREPARATION METHOD THEREOF

FIELD OF THE INVENTION

The present invention belongs to the technical field of oilfield exploitation, in particular relates to a low-shrinkage and high-strength plant-based resinous blocking agent and preparation method thereof.

BACKGROUND OF THE INVENTION

Waterflooding exploitation acts as a main means of major oilfields, but as oilfield exploitation enters a middle and later stage, in which the water content of oil wells increases significantly and flooding water and bottom water rapidly flood along a large crack channel, oil production decreases rapidly, therefore in order to raise an oil recovery rate, blocking the large crack channel is key. Due to its good rheology and high blocking strength, a resinous blocking agent can meet increasingly-complex downhole conditions, so it is quite widely used in chemically-blocking water in oilfields. The resinous blocking agent is mainly divided into a phenolic aldehyde resinous blocking agent, an urea-formaldehyde resinous blocking agent, a polyester resinous blocking agent, an epoxy resinous blocking agent and a composite resinous blocking agent. Among them, the phenolic aldehyde resinous blocking agent and the urea-formaldehyde resinous blocking agent have high strength and excellent stability, but they are not easy to degrade and difficult to unblock, so they are greatly confined in application. The polyester resinous blocking agent has good rheology, high post-curing glass transition temperature, high cementation strength and good salt resistance, but its system formula ingredients is complex and highly costed. The epoxy resin is the most widely used material in the current civil market, with low costs, and excellent prior-curing fluidity and penetration performance for base fluid, and this blocking agent has the advantages such as high strength, high toughness and long blocking duration. (Yang Biao, Huang Xueli, He Long, et al. Performance Evaluation of the Blocking agent System of Epoxy Resinous Liquid Glue [J]. Oilfield Chemistry, 2020, 37(02):239-244)

Benzoxazine resin is a new type of thermoset resin developed on the basis of traditional phenolic aldehyde resin, its volume shrinkage ratio is close to zero, and it has high glass transition temperature and good thermal stability. The raw materials for synthetizing benzoxazine are widely sourced, inexpensive, and environmentally friendly. The benzoxazine is added to the epoxy resin, so as to further enable the mechanical properties of the resinous blocking agent to improve. At present, the reported benzoxazine is mostly solid, and there are problems such as excessive viscosity of base liquid after dissolution and difficulty in injection in practical applications.

In the invention patent "resinous blocking agent and preparation method thereof" (CN111218264A), the resinous blocking agent is composed of epoxy resin, a diluent, a cross-linking agent, a toughening agent and a reinforcing agent, and has high compressive strength and good blocking effect, but the resinous blocking agent has deficiencies such as narrow application and uneasy degradation.

The present invention uses epoxy plant oil and benzoxazine to prepare a low-shrinkage and high-strength plant-based resinous blocking agent, which has advantages such as high strength, degradability, wide applicable temperature, and little damage to a reservoir stratum, and can be used in oilfields to raise an oil recovery rate in a middle and later stage of exploitation.

SUMMARY OF THE INVENTION

One objective of the present invention is to provide a low-shrinkage and high-strength plant-based resinous blocking agent, the blocking agent has the advantages such as high compressive strength and adhesion strength, degradability, low shrinkage, excellent blocking performance and low price, and has a broad market prospect.

Another objective of the present invention is to provide a preparation method of the low-shrinkage and high-strength plant-based resinous blocking agent, the method has advantages such as reliability to a principle, simpleness to operate, ease to obtain cheap raw materials, and controllability to a preparation process.

Another objective of the present invention is to provide an application of the low-shrinkage and high-strength plant-based resinous blocking agent in oil-gas reservoirs, the blocking agent can not only meet the requirements of oil-gas reservoirs for high-strength blocking agents, but also has great significance for repairing casing damaged wells, sealing interzonal channelings outside horizontal well casings, temporary blocking turnaround fracturing technology and proppant coating technology.

In order to achieve the above technical objectives, the present invention adopts the following technical solutions.

A low-shrinkage and high-strength plant-based resinous blocking agent has a macromolecule with a spatial network structure formed through mutual association of epoxy plant oil, benzoxazine and curing agents under the action of an initiator in a high-temperature environment.

A low-shrinkage and high-strength plant-based resinous blocking agent consists of the following substances according to weight parts: 37.2~47.8 parts of epoxy plant oil, 19.8~37.2 parts of benzoxazine, 22.9~31.6 parts of curing agents, 0.8~1.8 parts of initiators, 1.2~1.8 parts of toughening agents, 0.5~1.2 parts of reinforcing agents, the sum of the weight parts of the above substances is 100 parts.

The epoxy plant oil is obtained through epoxidation on unsaturated carbon-carbon double bonds in a molecule of dehydrated plant oil.

The benzoxazine is synthesized from long-chain diamine, monohydric plant phenol and paraformaldehyde.

Further, the epoxy plant oil is obtained through the following steps: dehydrating the plant oil, counting the number of moles of the plant oil by an average number of molars of each effective ingredient in the plant oil, according to the molar ratio of plant oil to formic acid to hydrogen peroxide as 1:(2~4):(7~9), weighing the corresponding mass of the pant oil, the formic acid and the hydrogen peroxide, then weighing an $Al^{3+}$ resin catalyst accounting for 3~5% of the total mass of the plant oil, the formic acid and the hydrogen peroxide, enabling them to react at 50~80° C. for 3~5 h while stirring at a rate of 300~500 r/min, and then purifying the reaction product through alkaline washing and water washing to obtain the epoxy plant oil.

Furthermore, the epoxy value of the epoxy plant oil is 5.5~6.5%, preferably 6.2~6.5%, and the obtained blocking agent can have better performance and lower costs within this range.

Further, the moisture content of the plant oil after dehydration is ≤1%, the mass fraction of the formic acid is 80~98%, and the mass fraction of the hydrogen peroxide is 28~35%.

Further, the $Al^{3+}$ resin catalyst is a D151 macro-porous weakly-acidic cation exchange resin, an IRA96RF macro-porous cation exchange resin or a D072H strongly-acidic cation exchange resin.

Further, the plant oil is one of soybean, corn and flaxseed oils. The plant oil includes 45%~50% of water, 20%~25% of phospholipid and 25%~30% of neutral oil, after dehydration, it mainly contains phospholipids and neutral oil, and its molecule contains a large number of unsaturated double bonds.

Further, the benzoxazine is obtained through the following steps: according to the molar ratio of the long-chain diamine to the monohydric plant phenol to the paraformaldehyde as 1:2:4, weighing the corresponding mass of the long-chain diamine, the monohydric plant phenol and the paraformaldehyde, then weighing toluene as an organic solvent, which is equivalent to the total mass of the long-chain diamine, the monohydric plant phenol and the paraformaldehyde, enabling them to react at 90~110° C. for 6~8 h while stirring, subsequently washing the product by alkali, filtering and drying it to obtain plant-based solid benzoxazine, which is then dissolved in a diluent to obtain liquid benzoxazine.

Further, the long-chain diamine is one of 1,6-hexanediamine, 1,10-diaminodecane and 1,8-octanediamine.

Further, the monohydric plant phenol is one of vanillin, guaiacol, and cashew phenol.

Further, the diluent is a mixture of styrene and one of methyl methacrylate, divinylbenzene and methacrylate glycidyl ether.

Further, the curing agent is one or more of cis-butenedioic anhydride, phthalic anhydride and methyl hexahydrophthalic anhydride.

Further, the initiator is 2-ethyl-4-methylimidazole.

Further, the toughening agent is acrylic rubber.

Further, the reinforcing agent is polyamide fiber.

A preparation method of the low-shrinkage and high-strength plant-based resinous blocking agent includes the steps of mixing the epoxy plant oil, the benzoxazine and the curing agent and stirring them evenly, then adding the initiator, the toughening agent and the reinforcing agent, continuing to stir them evenly, and curing at a constant temperature of 100~180° C. for 1~10 h to obtain a low-shrinkage and high-strength plant-based resinous blocking agent.

An application of the low-shrinkage and high-strength plant-based resinous blocking agent in oil-gas reservoirs, when the temperature of the oil-gas reservoir is 100~180° C. and the salinity is $22 \times 10^4$ mg/L, of the resinous blocking agent the curing time is 3~16 h, and the compressive strength is 55~100 MPa; when the temperature is 100~180° C., adding a degradation solution, so as to enable the resinous blocking agent to completely degrade within 16~72 h.

The degradation solution consists of 50% potassium formate solution, phenol, a heavy aromatic hydrocarbon solvent and OP-10 polyethylene glycol octyl phenyl ether.

The reaction process for preparing the benzoxazine is as follows:

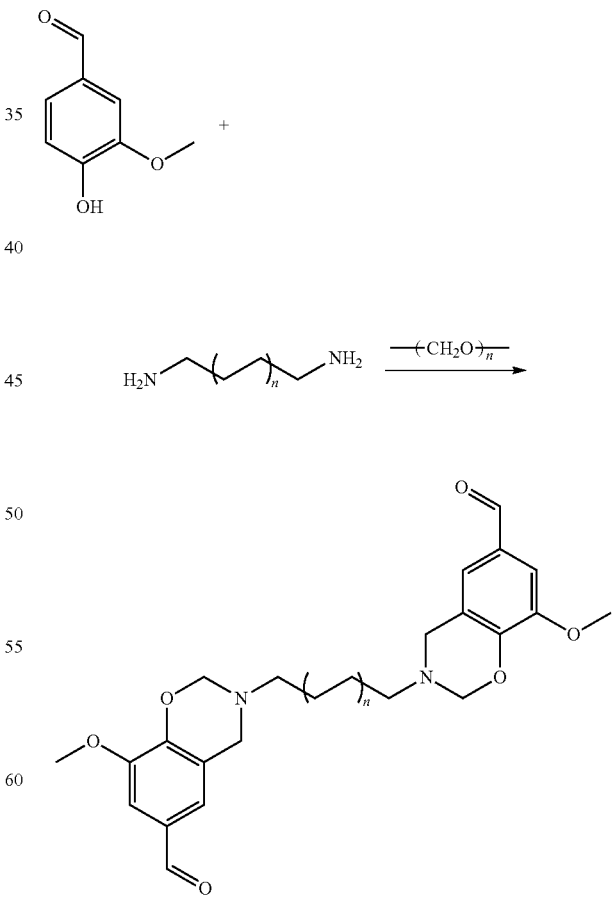

The reaction process of the benzoxazine with the epoxy plant oil is as follows:

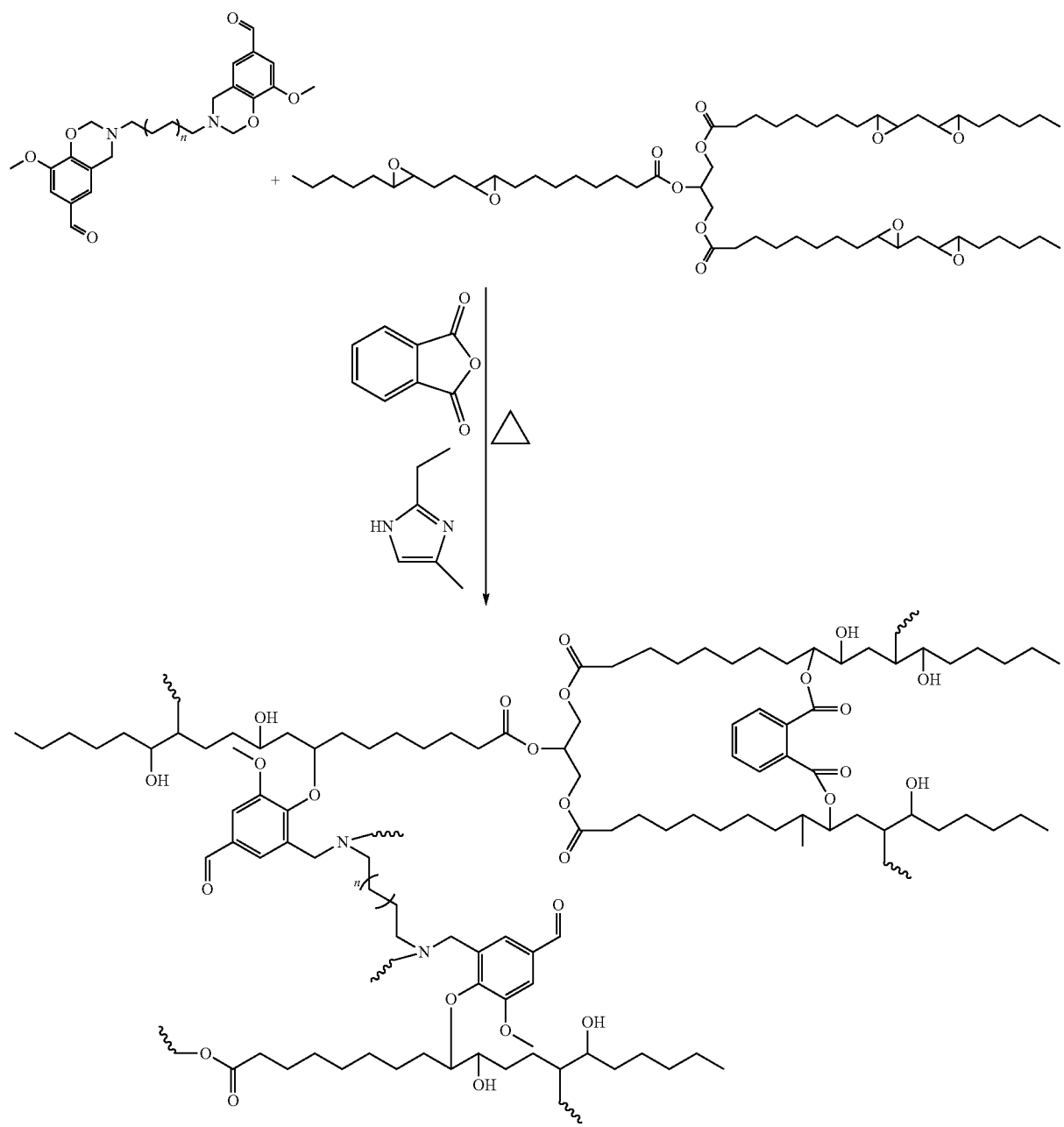

The present invention enables the epoxy plant oil, the benzoxazine and the curing agent to chemically react together, so as to form a body structure. The epoxy plant oil contains a large number of epoxy groups, which react for ring-opening under the action of the initiator in a high temperature environment, and then associate with the benzoxazine and the curing agent to form a macromolecule having a network structure. Due to no occurrence of small molecules and flexible long chain structures in the reaction of the epoxy resin with the benzoxazine, the reaction creates a dense three-dimensional network structure and form a polymer, which has high compressive strength and small shrinkage.

The present invention can significantly enhance the compressive strength of water shutoff agents through selection of amine and anhydride curing agents.

The toughening agent, acrylic rubber contains an acrylic monomer, which is easy to react with the epoxy group in the epoxy plant oil to enhance the toughness and shock resistance of resin material.

The reinforcing agent, polyamide fiber can shift and intercept the cracks formed by the polymer network structure under external force, and enhances the compression resistance of resin.

Compared with the prior art, the present invention has the following beneficial effects.

(1) The epoxy plant oil obtained through epoxidation on dehydrated plant oil has characteristics such as wide source, low price, environmental friendliness and degradability, and is of great significance from the perspective of the economy and the environment.

(2) The benzoxazine obtained through reaction of the bio-based monohydric plant phenol with the long-chain diamine and paraformaldehyde and mixture with diluents has characteristics such as wide source, low price and environmental friendliness.

(3) The resinous blocking agent is a liquid homogeneous system, which has low initial viscosity of resin, and no need to add diluents, which is plant-based and has little damage to a stratum, and which has no particles and can enter a tiny crack, so it has excellent penetration performance and can realize long-distance controllable blocking.

(4) The blocking agent is not miscible with oil and water after injection, its performance is not affected by crude oil and stratigraphic water in the stratum, the water shutoff agent is aged for 60 d under high temperature conditions, and its blocking strength is almost unchanged.

(5) The resinous blocking agent is mainly polymerized in the form of ester bonds and ether bonds, which will decompose in a strong alkali environment, the water shutoff agent being soaked in a degradation solution for 72 h can be completely degraded at 130° C., the blocking remover is a non-acid system, and the solution after removing blocking is similar to oil and water in properties, and will not cause harm to the oil reservoir.

DETAILED DESCRIPTION OF SOME EMBODIMENTS

In order to make the objective, the technical solution and the advantages of the present invention more clearly understandable, we shall further describe the present invention in detail in combination with the following examples. It should be understood that the specific examples described herein are only used to explain the present invention, not intended to define the present invention.

In an actual use process, the system ingredients can be appropriately adjusted according to the well conditions, well types, stratigraphic water quality and so on.

In order to avoid giving unnecessary details, in the following examples of the present invention, the epoxy plant oil is obtained through the following process.

Dehydrating the plant oil to a moisture content of ≤1%, according to the molar ratio of the plant oil to the formic acid to the hydrogen peroxide as 1:2.7:8, weighing the plant oil, the formic acid with 85% mass fraction and the hydrogen peroxide with 30% mass fraction, respectively, then weighing an $Al^{3+}$ resin catalyst (D151) accounting for 4% of the total mass of the plant oil, the formic acid and the hydrogen peroxide, enabling them to react at 60° C. for 4 h while stirring, and then purifying the reaction product through alkaline washing and water washing to obtain the epoxy plant oil (the epoxy value is 6.3%); wherein the plant oil is one of soybean, corn and flaxseed oils.

In order to avoid giving unnecessary details, in the following examples of the present invention, the benzoxazine is obtained through the following process.

According to the molar ratio of the 1,10-diaminodecane to the vanillin to the paraformaldehyde as 1:2:4, weighing the corresponding mass of the 1,10-diaminodecane, the vanillin and the paraformaldehyde, then weighing toluene as an organic solvent, which is equivalent to the total mass of the 1,10-diaminodecane, the vanillin and the paraformaldehyde, enabling them to react at 100° C. for 7 h while stirring, subsequently washing the product by alkali, filtering and drying it to obtain the plant-based solid benzoxazine, which is then dissolved in a diluent composed of styrene and methyl methacrylate to obtain the plant-based liquid benzoxazine.

Example 1

Adding 46.6 g of epoxy soybean oil and 20.5 g of benzoxazine to a 150 ml beaker, then slowly adding 29.7 g of phthalic anhydride to the beaker while stirring evenly at a speed of 500 r/min; next adding 1.2 g of 2-ethyl-4-methylimidazole, 1.5 g of acrylic rubber and 0.5 g of polyamide fiber to the beaker in proper order and continuing stirring for 1.5 h at a speed adjusted to 300 r/min, until obtaining reaction solution; weighing 20 g of the reaction solution and put it in a pressure bottle, then placing it in an oil bath at 100° C., enabling the reaction solution to react for 16 hours to be cured, so as to form the plant-based resin of which the compressive strength is 55.3 MPa, placing the cured resinous blocking agent in a degradation solution at 100° C., enabling it to completely degrade within 47 hours.

Example 2

Adding 43.8 g of epoxy corn oil and 23.4 g of benzoxazine to a 150 ml beaker, then slowly adding 28.8 g of cis-butenedioic anhydride to the beaker while stirring evenly at a speed of 500 r/min; next adding 1.4 g of 2-ethyl-4-methylimidazole, 1.7 g of acrylic rubber and 0.9 g of polyamide fiber to the beaker in proper order and continuing stirring for 1.5 h at a speed adjusted to 300 r/min, until obtaining reaction solution; weighing 20 g of the reaction solution and put it in a pressure bottle, then placing it in an oil bath at 180° C., enabling the reaction solution to react for 3 hours to be cured, so as to form the plant-based resin of which the compressive strength is 63.5 MPa, placing the cured resinous blocking agent in a degradation solution at 180° C., enabling it to completely degrade within 16 hours.

Example 3

Adding 41.9 g of epoxy flaxseed oil and 27.2 g of benzoxazine to a 150 ml beaker, then slowly adding 27.7 g of methyl hexahydrophthalic anhydride to the beaker while stirring evenly at a speed of 500 r/min; next adding 1.1 g of 2-ethyl-4-methylimidazole, 1.5 g of acrylic rubber and 0.6 g of polyamide fiber to the beaker in proper order and continuing stirring for 1.5 h at a speed adjusted to 300 r/min, until obtaining reaction solution; weighing 20 g of the reaction solution and put it in a pressure bottle, then placing it in an oil bath at 150° C., enabling the reaction solution to react for 5 hours to be cured, so as to form the plant-based resin of which the compressive strength is 70.3 MPa, placing the cured resinous blocking agent in a degradation solution at 150° C., enabling it to completely degrade within 20 hours.

Example 4

Adding 40.2 g of epoxy soybean oil and 30.4 g of benzoxazine to a 150 ml beaker, then slowly adding 15.4 g of phthalic anhydride and 10.8 g of cis-butenedioic anhydride to the beaker while stirring evenly at a speed of 500 r/min; next adding 1.2 g of 2-ethyl-4-methylimidazole, 1.2 g of acrylic rubber and 0.8 g of polyamide fiber to the beaker in proper order and continuing stirring for 1.5 h at a speed adjusted to 300 r/min, until obtaining reaction solution; weighing 20 g of the reaction solution and put it in a pressure bottle, then placing it in an oil bath at 140° C., enabling the reaction solution to react for 8 hours to be cured, so as to form the plant-based resin of which the compressive strength is 78.5 MPa, placing the cured resinous blocking agent in a degradation solution at 140° C., enabling it to completely degrade within 24 hours.

Example 5

Adding 38.1 g of epoxy corn oil and 33.6 g of benzoxazine to a 150 ml beaker, then slowly adding 24.6 g of methyl hexahydrophthalic anhydride to the beaker while stirring evenly at a speed of 500 r/min; next adding 1.4 g of 2-ethyl-4-methylimidazole, 1.2 g of acrylic rubber and 1.1 g of polyamide fiber to the beaker in proper order and continuing stirring for 1.5 h at a speed adjusted to 300 r/min, until obtaining reaction solution; weighing 20 g of the reaction solution and put it in a pressure bottle, then placing it in an oil bath at 120° C., enabling the reaction solution to react for 7 hours to be cured, so as to form the plant-based resin of which the compressive strength is 86.6 MPa, placing the cured resinous blocking agent in a degradation solution at 120° C., enabling it to completely degrade within 48 hours.

Example 6

Adding 37.2 g of epoxy flaxseed oil and 36.4 g of benzoxazine to a 150 ml beaker, then slowly adding 23.2 g of phthalic anhydride to the beaker while stirring evenly at a speed of 500 r/min; next adding 1.1 g of 2-ethyl-4-methylimidazole, 1.2 g of acrylic rubber and 0.9 g of polyamide fiber to the beaker in proper order and continuing stirring for 1.5 h at a speed adjusted to 300 r/min, until obtaining reaction solution; weighing 20 g of the reaction solution and put it in a pressure bottle, then placing it in an oil bath at 130° C., enabling the reaction solution to react for 3 hours to be cured, so as to form the plant-based resin of which the compressive strength is 94.7 MPa, placing the cured resinous blocking agent in a degradation solution at 130° C., enabling it to completely degrade within 28 hours.

Comparative Example 1

The curing agent in Example 6 is replaced with dicyandiamide, and other ingredients, use levels and reaction conditions are consistent with Example 6. The curing time is 30 h, of the formed plant-based resin the compressive strength is 45.4 MPa, and the degradation rate is 12.6% within 96 hours when the cured resinous blocking agent is placed in the degradation solution at 130° C.

Comparative Example 2

The benzoxazine in Example 6 is replaced with epoxy flaxseed oil same in quality, and other ingredients, use levels and reaction conditions are consistent with Example 6. The curing time is 3 h, and the compressive strength after curing is 21.3 MPa.

Blocking Performance Test:

The blocking agents prepared in Examples 1-6 are recorded as 1 #-6 #, respectively, so as to investigate their blocking performances. The test steps are as follows: using a 1-5 mm steel core as a research object, injecting a high-strength resinous blocking agent into the steel core at a displacing velocity of 1 mL/min, and curing at 120~180° C. to form blocking, executing flooding displacement at 1 mL/min, after stabilizing the pressure, obtaining the displacement pressure after blocking shown in Table 1; next injecting a degradation solution and degrading at a constant temperature of 120~180° C., and executing flooding displacement at 1 mL/min, measuring the penetration ratio after degrading shown in Table 1.

TABLE 1 blocking ratios of blocking agents in different systems

| Example | $k_0$, $\mu m^2$ | before degrading | | after degrading | |
|---|---|---|---|---|---|
| | | $k_1$, $\mu m^2$ | E, % | $k_2$, $\mu m^2$ | E, % |
| 1# | 1.35 | 0.004 | 99.7 | 1.341 | 0.67 |
| 2# | 1.35 | 0.003 | 99.77 | 1.339 | 0.81 |
| 3# | 1.35 | 0.003 | 99.77 | 1.340 | 0.74 |
| 4# | 1.35 | 0.002 | 99.85 | 1.338 | 0.89 |
| 5# | 1.35 | 0.004 | 99.7 | 1.345 | 0.37 |
| 6# | 1.35 | 0.003 | 99.77 | 1.339 | 0.81 |

The results show that the blocking ratios E before degradation in Examples 1~6 are higher than 99%, and the blocking ratios E after degradation are less than 1%, indicating that benzoxazine-modified plant-based epoxy resinous blocking agent has excellent blocking performance and degradation performance.

Shrinkage Performance Test:

The blocking agents prepared in Examples 1~6 are recorded as 1 #~6 #, respectively, so as to calculate the volume shrinkage ratio of cured resin according to the test method of GB/T 24148.9-2014, and the results are shown in Table 2.

TABLE 2 shrinkage ratios of blocking agents in different systems

| Example | before curing $\rho_1$, g/cm$^3$ | after curing $\rho_2$, g/cm$^3$ | shrinkage ratio, % |
|---|---|---|---|
| 1# | 1.1229 | 1.1238 | 0.08 |
| 2# | 1.1234 | 1.1241 | 0.06 |
| 3# | 1.1227 | 1.1239 | 0.11 |
| 4# | 1.1235 | 1.1243 | 0.07 |
| 5# | 1.1229 | 1.1239 | 0.09 |
| 6# | 1.1232 | 1.1238 | 0.05 |

The results show that the curing shrinkage ratios in Examples 1~6 are less than 0.11%, indicating that benzoxazine-modified plant-based epoxy resinous blocking agent has a low curing shrinkage ratio.

The above content is only a better embodiment of the present invention, but the protection scope of the present invention is not limited to this, and any change or replacement that can be easily conceived by a person skilled in the art within the scope of the technology disclosed in the present invention should fall within the protection scope of the present invention.

What is claimed is:

1. A low-shrinkage and high-strength plant-based resinous blocking agent consisting of the following substances according to weight parts:
   37.2-47.8 parts of epoxy plant oil;
   19.8-37.2 parts of benzoxazine;
   22.9-31.6 parts of curing agents;
   0.8-1.8 parts of initiators;
   1.2-1.8 parts of toughening agents; and
   0.5-1.2 parts of reinforcing agents, wherein the sum of the weight parts of the above substances is 100 parts, said epoxy plant oil is obtained through epoxidation on unsaturated carbon-carbon double bonds in a molecule of dehydrated plant oil, wherein said curing agent is cis-butenedioic anhydride, and said benzoxazine is synthesized from long-chain diamine, monohydric plant phenol and paraformaldehyde, wherein said benzoxazine is obtained through the following steps:

according to a molar ratio of said long-chain diamine to said monohydric plant phenol to said paraformaldehyde as 1:2:4, weighing a corresponding mass of said long-chain diamine, said monohydric plant phenol and said paraformaldehyde, then weighing toluene as an organic solvent, which is equivalent to a total mass of said long-chain diamine, said monohydric plant phenol and said paraformaldehyde; and enabling them to react at 90-110° C. for 6-8 h while stirring, subsequently washing the product by alkali, filtering and drying the product to obtain plant-based solid benzoxazine, which is then dissolved in a diluent to obtain said liquid benzoxazine.

2. The low-shrinkage and high-strength plant-based resinous blocking agent according to claim 1, wherein said epoxy plant oil is obtained through the following steps:

dehydrating plant oil, counting a number of moles of the plant oil by an average number of molars of each effective ingredient in the plant oil, according to a molar ratio of plant oil to formic acid to hydrogen peroxide as 1:(2-4):(7-9);

weighing a corresponding mass of the plant oil, the formic acid and the hydrogen peroxide, then weighing an $Al^{3+}$ resin catalyst accounting for 3-5% of a total mass of the plant oil, the formic acid and the hydrogen peroxide, enabling them to react at 50-80° C. for 3-5 h while stirring at a rate of 300-500 r/min; and purifying the reaction product through alkaline washing and water washing to obtain said epoxy plant oil.

3. The low-shrinkage and high-strength plant-based resinous blocking agent according to claim 1, wherein said long-chain diamine is one of 1,6-hexanediamine, 1,10-diaminodecane and 1,8-octanediamine.

4. The low-shrinkage and high-strength plant-based resinous blocking agent according to claim 1, wherein said monohydric plant phenol is one of vanillin, guaiacol, and cashew phenol.

5. The low-shrinkage and high-strength plant-based resinous blocking agent according to claim 1, wherein said initiator is 2-ethyl-4-methylimidazole.

6. The low-shrinkage and high-strength plant-based resinous blocking agent according to claim 1, wherein said toughening agent is acrylic rubber, said reinforcing agent is polyamide fiber.

* * * * *